United States Patent [19]

Gilbreath

[11] Patent Number: 4,545,559

[45] Date of Patent: Oct. 8, 1985

[54] OUTBOARD MOTOR SUPPORT BRACKET

[76] Inventor: James C. Gilbreath, 26225 Big Pines Hwy., Wrightwood, Calif. 92397

[21] Appl. No.: 608,376

[22] Filed: May 9, 1984

[51] Int. Cl.[4] .......... F16M 1/00

[52] U.S. Cl. .......... 248/642; 440/900

[58] Field of Search .......... 248/640, 641, 642, 643, 248/279.3; 403/232.1; 440/900

[56] References Cited

U.S. PATENT DOCUMENTS

| | | | |
|---|---|---|---|
| 1,704,303 | 3/1929 | Savage | 248/641 |
| 2,822,142 | 2/1958 | Collins | 248/641 |
| 2,966,876 | 1/1961 | MacWilliams | 248/642 |
| 3,032,304 | 5/1962 | Machlan | 440/900 X |
| 3,075,490 | 1/1963 | Lang | 248/642 X |
| 3,242,899 | 3/1966 | Hanson | 248/642 X |
| 3,245,641 | 4/1966 | Hart | 440/900 X |
| 3,486,766 | 12/1969 | Persons | 248/297.3 X |
| 3,881,442 | 5/1975 | Seiple | 248/640 |
| 4,023,694 | 5/1977 | Hawkins | 403/234 X |
| 4,239,172 | 12/1980 | Spitzmesser | 248/641 |
| 4,306,703 | 12/1981 | Finze | 440/900 X |
| 4,448,387 | 5/1984 | Gilbreath | 248/642 |

FOREIGN PATENT DOCUMENTS

| | | | |
|---|---|---|---|
| 53477 | 9/1974 | Australia | 248/642 |

*Primary Examiner*—J. Franklin Foss
*Assistant Examiner*—David L. Talbott
*Attorney, Agent, or Firm*—Christie, Parker & Hale

[57] ABSTRACT

A lightweight one-piece bracket for supporting an outboard motor in rearwardly spaced relation to the transom of a boat, the bracket being formed by U-shaped tubular frame members held in spaced relation to each other by struts and having transom mounting pads united with the free ends of the frame member legs at one end of the bracket and having motor mounting pads united with the opposite ends of the frame member.

6 Claims, 6 Drawing Figures

Fig. 2
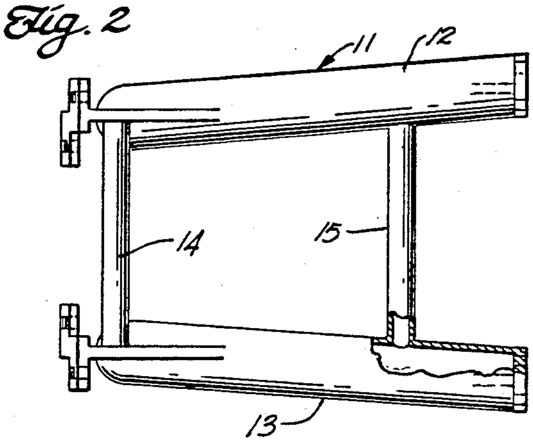
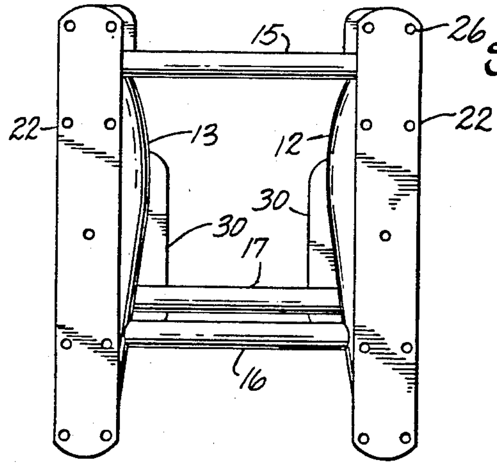
Fig. 3
Fig. 4
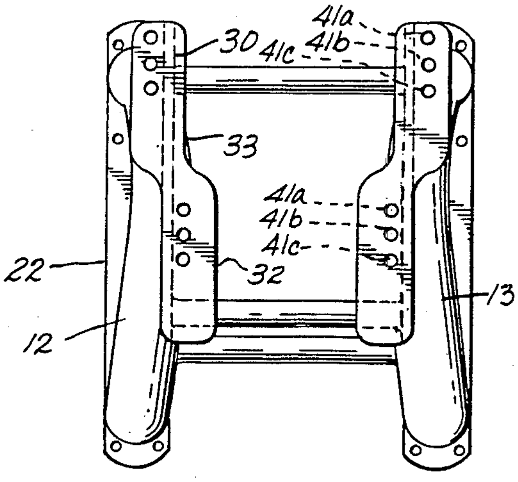

Fig. 5
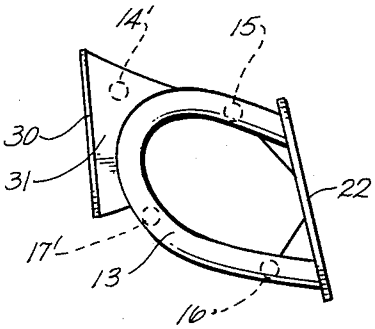
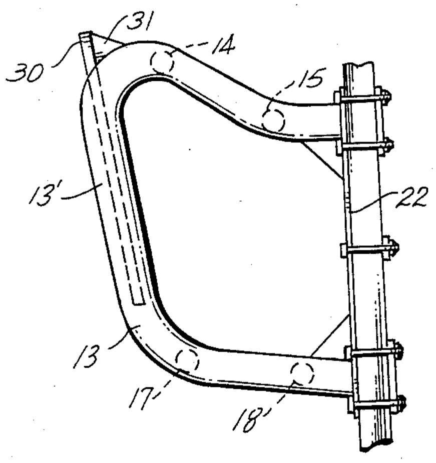
Fig. 6

OUTBOARD MOTOR SUPPORT BRACKET

RELATED APPLICATION

This is a continuation-in-part of application Ser. No. 06/417,389 filed Sept. 13, 1982, now U.S. Pat. No. 4,448,387.

FIELD OF THE INVENTION

This invention relates to motor boats and has particular reference to means for mounting an outboard motor to a boat hull.

BACKGROUND OF THE INVENTION

Since the advent of highly efficient and relatively powerful outboard motors, such motors have become increasingly popular and are found to present distinct advantages over inboard mounted motors. For example, outboard motors save hull space normally occupied by inboard motors and their accessories. They also eliminate the need to provide an underwater bearing through the boat hull for the propeller shaft and they are much easier to mount to the boat.

Heretofore, outboard motors, particularly in the 100 horsepower to 300 horsepower class, have generally been clamped or bolted directly to the boat transom. This requires, in most cases, cutting or notching the upper portion of the transom which reduces the seaworthiness of the boat and weakens the transom.

Motor mounting brackets have been proposed, heretofore, to support an outboard motor at a distance rearwardly of the transom. However, those brackets of which I am aware are either too weak to properly support a relatively powerful outboard motor against the considerable drive force and vibration thereof or are too heavy and/or contain a number of movable parts which reduces the reliability and ruggedness of the bracket.

Accordingly, a principal object of the present invention is to provide an outboard motor support bracket which is of minimum weight and yet strong enough to adequately mount a relatively powerful outboard motor at a distance rearwardly of a boat hull.

Another object of the invention is to provide a one-piece outboard motor support bracket which enables vertical adjustment of the motor relative to the boat hull without the need for relatively movable parts.

Another object of the invention is to distribute the stresses resulting from the driving forces and vibrations generated by an outboard motor over a relatively large area of the boat transom.

Another object of the invention is to eliminate the need for cutting or notching a boat transom in order to mount an outbard motor thereto.

SUMMARY OF THE INVENTION

According to the present invention, a lightweight one-piece outboard motor support bracket is provided comprising a pair of U-shaped tubular frame members, each formed with a reverse bend or semi-circular end portion and a pair of legs diverging therefrom. The pairs of legs are integrally united at their ends with respective transom mounting pads forming the transom mounting base of the bracket. Cross struts extend between the tubular frame members to form a rigid box-like frame. The semi-circular end portions of the frame members are integrally united with respective motor mounting pads through gusset plates, the motor mounting pads extending substantially parallel to the transom mounting pads. The motor mounting pads form the motor mounting base of the bracket.

The tubular frame members diverge forwardly from the motor mounting pads, when viewed in plan, resulting in a roughly pyramidal bracket in which the transom mounting base is wider in coordinate directions than the motor mounting base. This reduces concentration of stresses applied to the transom by the driving force and vibrations of the motor.

The uniting of each motor mounting pad with the semi-circular end portion of the respective tubular frame member through a gusset plate which extends around the periphery of the semi-circular portion results in an assembly of minimum weight and yet maximum strength.

Vertically spaced sets of bolt mounting holes are formed in the motor mounting pads, enabling the motor to be selectively mounted in different positions vertically so that the propeller may be located at an optimum height relative to the boat hull.

BRIEF DESCRIPTION OF THE DRAWINGS

For a more complete understanding of the invention, reference should be made to the accompanying drawings, wherein:

FIG. 2 is a plan view of the motor support bracket;

FIG. 3 is a front end view of the motor support bracket;

FIG. 4 is a rear end view of the motor support bracket;

FIG. 5 is a side view of another embodiment of the motor support bracket; and FIG. 6 is a side view of still another embodiment of the motor support bracket.

DESCRIPTION OF THE PREFERRED EMBODIMENT

Figure 1:
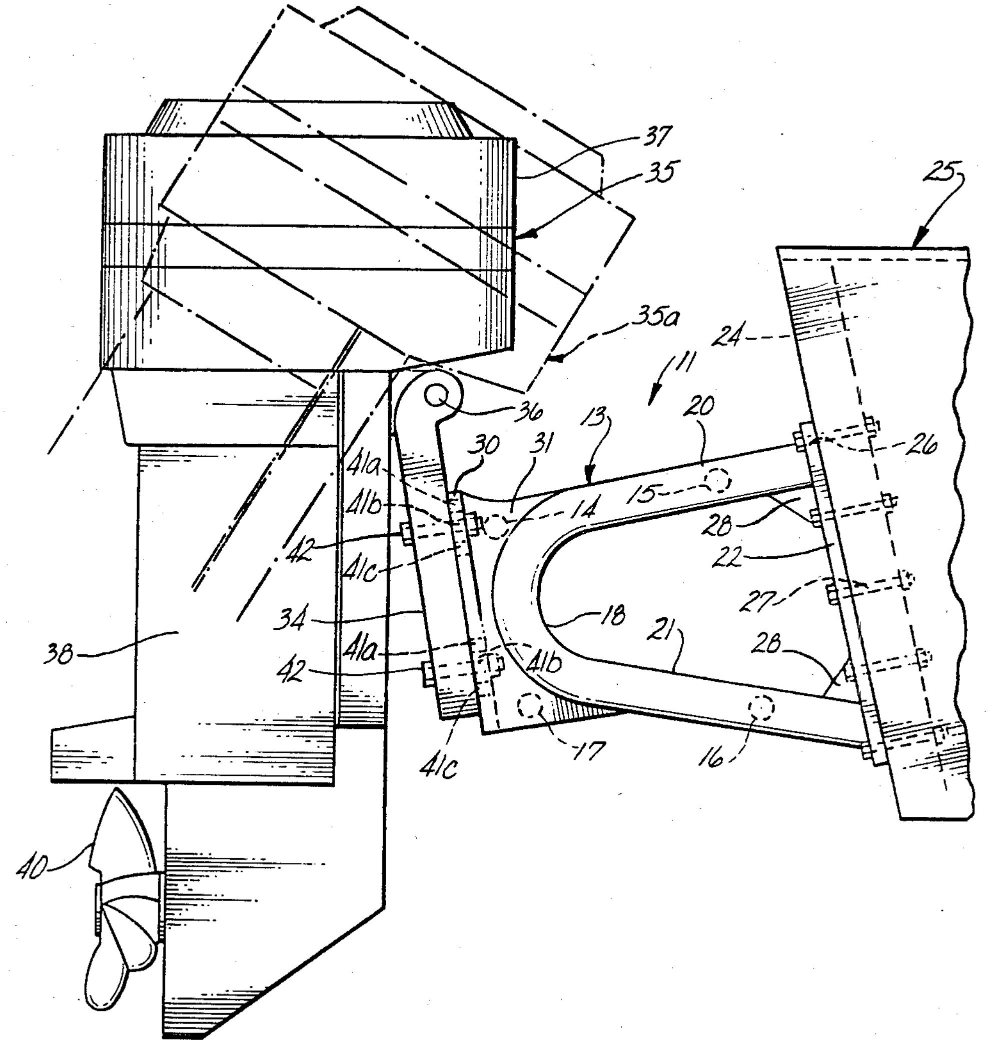
FIG. 1 is a side view illustrating an outboard motor support bracket embodying a preferred form of the present invention and showing the same mounted on a boat hull and supporting an outboard motor.

Although this invention is susceptible to embodiment in many different forms, a specific embodiment is shown in the drawing and will be described with the understanding that the present disclosure is to be considered as an exemplification of the principles of the invention and is not intended to limit the invention to the embodiment illustrated. The scope of the invention will be pointed out in the appended claims.

Referring to the drawing, the outboard motor support bracket is generally indicated at 11 and comprises a pair of U-shaped tubular frame members 12 and 13 held in rigid spaced relation to each other by tubular cross struts 14, 15, 16, and 17 which are integrally united at their ends to the members, as by welding, to form a rigid box-type framework.

Each of the tubular frame members 12 and 13 has a cylindrical cross section and forms a semi-circular or reverse bend rear portion 18 and two forwardly diverging legs 20 and 21. The latter are integrally united, as by welding, to a respective one of two transom mounting pads 22. The latter is formed of a solid flat bar.

For the purpose of mounting the support brakcet 11 to the transom 24 at the stern of a boat, generally indicated at 25, mounting holes 26 are spaced along the length of each pad 22. Bolts 27 are passed through the holes 26 and through aligned holes in the transom.

Gusset plates 28 are united, as by welding, between the legs 20 and 21 of each tubular frame member and its transom support pad 22 to insure a rigid joint therebetween.

Motor mounting pads 30 are united with the semicircular end portions 18 of the frame members 12 and 13 through respective gusset plates 31, as by welding. The gusset plates 31 extend around the peripheries of the semi-circular portions 18 to insure a strong rigid connection between the pads 30 and the members 12 and 13 and to prevent bending or flexing of the latter.

Each of the motor mounting pads 30 is formed of a flat solid bar, the lower portion 32 thereof being offset relative to the upper portion 33, as seen in FIG. 4, to fit against the mounting bracket 34 of an outboard motor 35. Such pads 30 extend substantially parallel to the mounting pads 22.

The motor 35 may be of different configurations depending on its manufacturer. However, generally, the motor comprises the mounting bracket 34 which pivotally supports the motor for adjustment about a pivot shaft 36. The motor further comprises a power head 37 located at the upper end of a drive train housing 38. A propeller 40 is mounted at the lower end of the housing 38.

Normally, the motor 35 is held by means not shown in its full line position shown in FIG. 1 relative to the bracket 34. However, it may be tilted about the shaft 36 into its dot-dash line position **35*a*** when transporting the boat or when the latter is at rest in the water.

It may be desirable to adjust the motor 35 vertically relative to the bottom of the boat for optimum speed and performance. For this purpose, three vertically aligned sets of mounting holes **41*a*, 41*b*, and 41*c* are formed in each of the motor mounting pads 30 to receive four mounting bolts, two of which are shown at 42, which are passed through aligned holes in the motor bracket 34. Thus, by passing the bolts through different ones of the sets of holes 41*a*, 41*b*, and 41*c*, the motor may be vertically adjusted to any of three different positions relative to the level of the boat. Additional sets of holes may be formed in the pads 30** to provide for further adjustment, if desired.

It has been discovered that by spacing the motor 35 rearwardly of the boat by means of the present mounting bracket 11, an increase in speed is effected, at least partly because the propeller 40 is removed from close proximity to the boat hull, resulting in less interference between the turbulence of the water in the region surrounding the propeller and the hull.

Additionally, the present mounting bracket 11 eliminates the need for cutting away or notching the transom to receive the motor and also eliminates the need for the usual water well which is normally located within the boat and adjacent the transom. Also, since the transom need not be notched, it will retain its original strength and will maintain the same freeboard height thereacross to thus reduce any tendency of swamping.

Further, it has been found that by spacing the motor rearwardly of the boat, better steering control and stability is effected, and also, it has been found that less noise is transmitted from the motor to the boat hull.

Referring to FIGS. 5 and 6, there are shown alternate embodiments which provide support brackets that can be used with boats having different transom angles and which can accomodate different engine setbacks and outboard engines of different shaft lengths. Thus the motor support, as shown in FIG. 5, is designed for use with a transom having an angle of 12° from the vertical and to provide a mounting plate 30 in which the top of the motor mounting plate is substantially higher than the top of the transom mounting plate 22. This is accomplished by modifying the shape of the tubular frame members 12 and 13 so that the upper leg of each frame member extends downwardly at a slightly converging angle relative to the lower leg of the tubular member 13. Also the angle of the motor mounting plate 30, rather than being parallel with the transom, may be modified to support the engine in a slightly more vertical relationship to the water line than the angle of the transom.

In the arrangement of FIG. 6, there is shown a mounting for a vertical transom with the engine mounting plates supporting the engine above the transom and at an angle of, for example, 15° from the vertical. The tubular frame members 12 and 13 in the arrangement of FIG. 6 are formed with a substantially straight center section, as indicated at 13′, which is aligned with the engine pads 30, allowing the engine pads to be secured directly to and between the tubular frame members. While the frame members are preferably made of cylindrical hollow steel tubing for maximum strength with minimum weight, tubing of other cross sectional shapes or even solid bar stock may be used to form the frame members.

What is claimed is:

1. A one-piece outboard motor support bracket for securing a motor mount to the transom of a boat, comprising:

a pair of frame members, each frame member being formed in a substantially U-shape having two leg portions joined by an intermediate closed end portion, transom mounting pads integrally united to the free ends of said leg portions of respective ones of said frame members, motor mounting pads adjacent respective ones of said closed end portions of respective ones of said U-shaped frame members, said motor mounting pads extending in spaced relationship to said transom mounting pads for supporting an outboard motor mount at a fixed predetermined angle relative to the boat transom, and strut means for maintaining said frame members in fixed laterally spaced apart relation, the motor mounting pads being secured at fixed predetermined vertical level relative to the transom pads to hold the outboard motor a fixed level above the water line of the boat.

2. The support bracket of claim 1 in which the end portion joining the two leg portions of each frame member includes a substantially straight section, the motor mounting pads being respectively joined to said straight sections and extending inwardly of the frame members toward each other.

3. The support bracket of claim 2 wherein the straight section of the frame members and the motor mounting pads extend vertically at a small angle to transom mounting pads.

4. The support bracket of claim 1 wherein the top of the motor mounting pads relative to the top of the transom pads is substantially higher as measured in a direction perpendicular to the water level of the boat on which the bracket is mounted.

5. A motor mounting bracket for securing an outboard engine to the transom of a boat, comprising:

transom pads adapted to be secured to a boat transom, motor mounting means adapted to be attached to the outboard engine, a pair of frame members bent in a substantially U-shape to form a pair of leg portions joined by an end portion, the frame members being laterally positioned with the two leg portions of each frame member abutting respective ones of said transom pads and the end portions projecting away from the transom pads, cross members extending between and secured to the frame members to hold the frame members and associated transom pads in laterally spaced relation, and means securing the motor mounting means to the respective end portions of the frame members.

6. The apparatus of claim 5 wherein the motor mounting means includes a pair of pads secured respectively to the projecting end portions of the two U-shaped frame members.

* * * * *